(12) United States Patent
Tobergte

(10) Patent No.: US 6,430,519 B1
(45) Date of Patent: Aug. 6, 2002

(54) METHOD FOR EVALUATING AN INPUT DATA SIGNAL AND CIRCUIT SYSTEM FOR CARRYING OUT SAID METHOD

(75) Inventor: Wolfgang Tobergte, Halstenbek (DE)

(73) Assignee: Philips Electronics No. America Corp., New York, NY (US)

( * ) Notice: Subject to any disclaimer, the term of this patent is extended or adjusted under 35 U.S.C. 154(b) by 0 days.

(21) Appl. No.: 09/485,575

(22) PCT Filed: Jun. 17, 1999

(86) PCT No.: PCT/IB99/01128

§ 371 (c)(1),
(2), (4) Date: Feb. 11, 2000

(87) PCT Pub. No.: WO99/67736

PCT Pub. Date: Dec. 29, 1999

(30) Foreign Application Priority Data

Jun. 20, 1998 (DE) .......................................... 198 27 625

(51) Int. Cl.⁷ ............................................... G06F 19/00
(52) U.S. Cl. ........................... 702/66; 702/69; 702/70; 702/72; 702/77; 324/76.12; 370/203; 370/206
(58) Field of Search ............................. 702/66, 69, 70, 702/72, 77; 375/235, 296, 346, 350, 371, 353; 708/200, 322, 400, 511, 403; 370/203, 206, 210; 360/32, 39; 324/76.12, 76.18, 76.19

(56) References Cited

U.S. PATENT DOCUMENTS 4,621,173 A * 11/1986 Guidox ........................ 370/291
4,646,173 A *  2/1987 Kammeyer et al. ........... 360/51
5,799,114 A *  8/1998 Dowling ..................... 708/403

* cited by examiner

*Primary Examiner*—John S. Hilten
*Assistant Examiner*—Hien Vo
(74) *Attorney, Agent, or Firm*—Gwenaelle Le Pennec

(57) ABSTRACT

A method, a circuit arrangement and an apparatus are provided for evaluating an input data signal transmitted by load modulation. A complex data signal is derived from the input data and a mean value signal of the complex data signal is thereafter derived. A complex signal without mean value is also formed from the difference between the complex data signal and the mean value signal of the complex data signal. A first and second quadratic error signals are derived and subsequently a slope signal is derived from the first and second quadratic signals. The method also comprises deriving an information signal by comparing the imaginary part signal without mean value with a decision threshold signal. The information signal indicates whether a value of the input data signal has been generated in a loaded state or an unloaded state during the load modulation.

16 Claims, 5 Drawing Sheets

METHOD FOR EVALUATING AN INPUT DATA SIGNAL AND CIRCUIT SYSTEM FOR CARRYING OUT SAID METHOD

FIELD OF THE INVENTION

The invention relates to a method for evaluating an input data signal generated by load modulation, and also to a circuit arrangement for carrying out such a method.

BACKGROUND ART

In magnetically coupled, contactless identification systems consisting of one or more contactless data carriers and a write/read apparatus, the data transmission from the data carrier to the write/read apparatus and vice versa is tested on the basis of the so-called maximum read/write distance. The maximum read/write distance offers an important criterion as regards the operation of the devices, notably when the write/read apparatus and the data carrier (carriers) are to operate only in the tested combination.

The contactless data carriers are magnetically coupled to the write/read apparatus. The energy for the power supply of the data carrier as well as the data signals themselves are transferred via the magnetic coupling. The transfer of the data signals from the data carrier to the write/read apparatus takes place via load modulation. To this end, an additional impedance, referred to as a load impedance, is switched on and off by the data signal on the data carrier. An arrangement of this kind is shown in general form in FIG. 1. An inductance 1 of the write/read apparatus and an inductance 2 of the data carrier therein constitute the arrangement for the magnetic coupling of the data signals and the power supply.

Parallel to the inductance 2 of the data carrier there is connected a first impedance 3 which serves as a fixed load, and also a load impedance 5 which can be activated via a switch 4. The switch 4 is preferably electronically controlled by the data signal to be applied from the data carrier to the write/read apparatus (see the arrow 6).

For independent development of the write/read apparatus on the one hand and the data carrier on the other hand, and for definition of the operating parameters, specification of these two components is necessary in the sense of standardization according to the ISO standard 14.443. In this context it is to be noted that the standard ISO/IEC JTC1/SC17/WG8/TF2 proposes a measuring arrangement for determining the modulation of the data carrier, by means of a coil system which is diagrammatically shown in FIG. 2. The mechanical and electrical data of this measuring arrangement are defined in the document "Working Draft ISO/124443". In the construction shown in FIG. 2 a field coil 7 generates a magnetic field having an adjustable field strength. In the absence of a data carrier this field induces equally high voltages in two measuring coils 8, 9 which are symmetrically arranged relative to the field coil 7. The two measuring coils 8, 9 are connected in series in phase opposition, so that the difference voltage between the voltages induced in the measuring coils is at least substantially zero. The difference voltage can be adjusted to a minimum value by means of an adjusting device (not shown).

When a data carrier 10 is introduced into one of the measuring coils, the load in the form of the data carrier 10 causes the voltages induced in the measuring coils 8, 9 to no longer compensate one another, so that the difference voltage indicates the loading by the data carrier 10. Load modulation of the data carrier thus provides amplitude modulation of the difference voltage. Such an amplitude modulated difference voltage is denoted by the reference UD in FIG. 2.

SUMMARY OF THE DRAWINGS

It has been found in practice that the evaluation of the amplitude modulation is dependent on the equalization of the measuring coils 8, 9, i.e. that it can be falsified by equalization errors. It is an object of the invention to provide a method and a circuit arrangement which enable more reliable evaluation of a data signal transmitted via load modulation.

According to the invention this object is achieved by means of a method as defined in claim 1 and a circuit arrangement as defined in claim 10. The method according to the invention and the circuit arrangement according to the invention utilize the recognition of the fact that the load modulation not only induces modulation of the amplitude, but also modulation of the phase. The invention evaluates the amplitude modulation as well as the phase modulation in common, so that improved protection against disturbances can be achieved. Moreover, for measuring purposes a plurality of transmission parameters can be simultaneously determined in a very simple manner. The detection and determination of these parameters can be carried out in automatic measuring devices.

Figure 1:
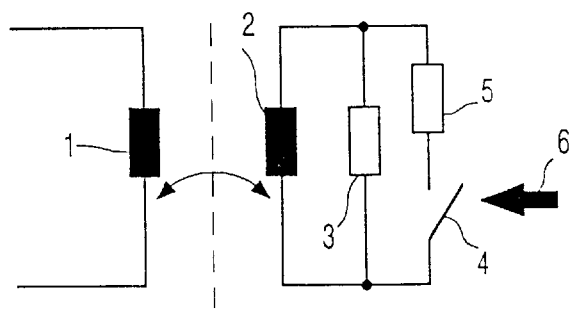

The method according to the invention enables determination of the modulation properties on the basis of the input data signal generated by load modulation. To this end, first a complex data signal is generated from the input data signal. In an advantageous version of the invention, as disclosed in the dependent Claims, such determination can be performed by quadrature mixing and by assigning the so-called in-phase signal of a quadrature mixer used to the real part and the quadrature signal to the imaginary part of a complex envelope. For the complex data signal, then being present in the form of the complex envelope, a decision line is then determined in the complex plane, i.e. in the representation of this signal as a complex locus curve, by making the complex envelope approximate a straight line, rotating it through 90° in the representation of the complex locus curve, and making it extent through the mean value of the complex envelope. The decision line thus divides the complex envelope into two parts for the two load states "loaded" and "unloaded" which can be distinguished in the demodulation of the input data signal generated by load modulation. Finally, the two mean values of the complex envelopes can be determined for these two load states, and the modulation properties and the input data signal can be evaluated on the basis thereof.

Instead of evaluating the complex envelope, a complex baseband signal can also be evaluated. The evaluation can also be performed by digital or analog Fourier transformation instead of quadrature mixing. It is also possible to perform sampling in the time domain instead of using a quadrature mixer, i.e. preferably by means of two sample-and-hold circuits whose sampling instants have been offset by at least approximately one quarter of the period duration of the carrier oscillation of the input data signal.

The method according to the invention and the circuit arrangement for carrying out such a method can thus be very universally used.

In the preferred versions disclosed in the dependent Claims, the amplitude swing resulting from the difference between the absolute values of the two mean values for the two states can be determined from the mean signal values, separately determined for the loaded state and the unloaded state, by evaluation of the amplitude modulation. This value, divided by the sum of the absolute values of said two mean values, determines the modulation index.

The phase modulation can be evaluated by determining the mean phase angles of the input data signal for the two states. The difference between these phase angles, i.e. the phase angle between the two complex mean values for the two states, yields the phase swing of the load modulation.

Moreover, the absolute value of the difference between the two complex mean values for the loaded state and the unloaded state can be evaluated as a complex modulation swing.

The invention is implemented preferably in an apparatus for evaluating an input data signal which is generated by a data carrier by load modulation. Such apparatus is formed by measuring equipment; however, it can also be used in a wide variety of applications in the data communication field. In practice a high transmission reliability can thus be achieved for a wide variety of applications.

BRIEF DESCRIPTION OF THE INVENTION

Figure 3:
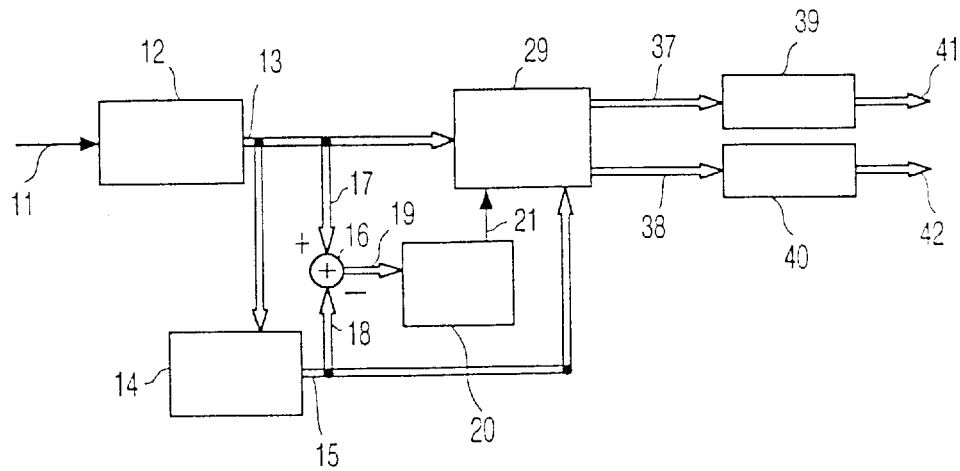
Figure 4:
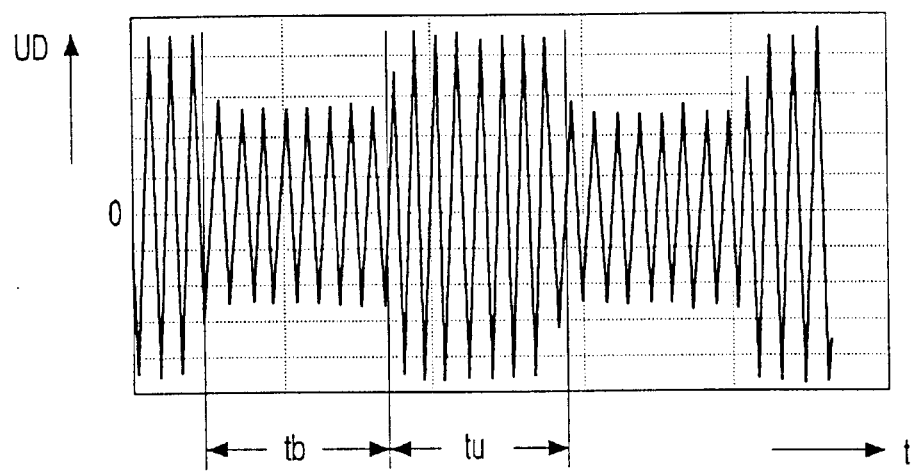
Figure 5A:
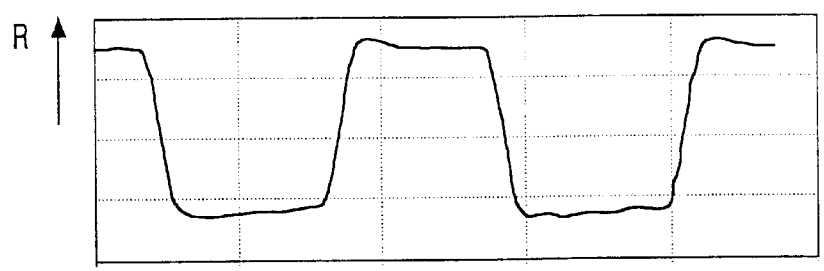
Figure 5B:
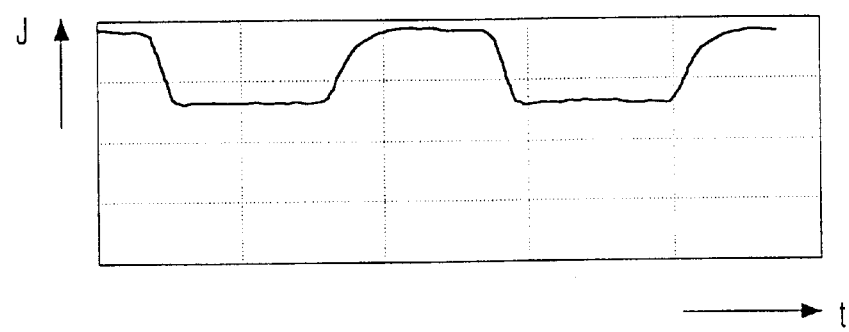
Figure 6:
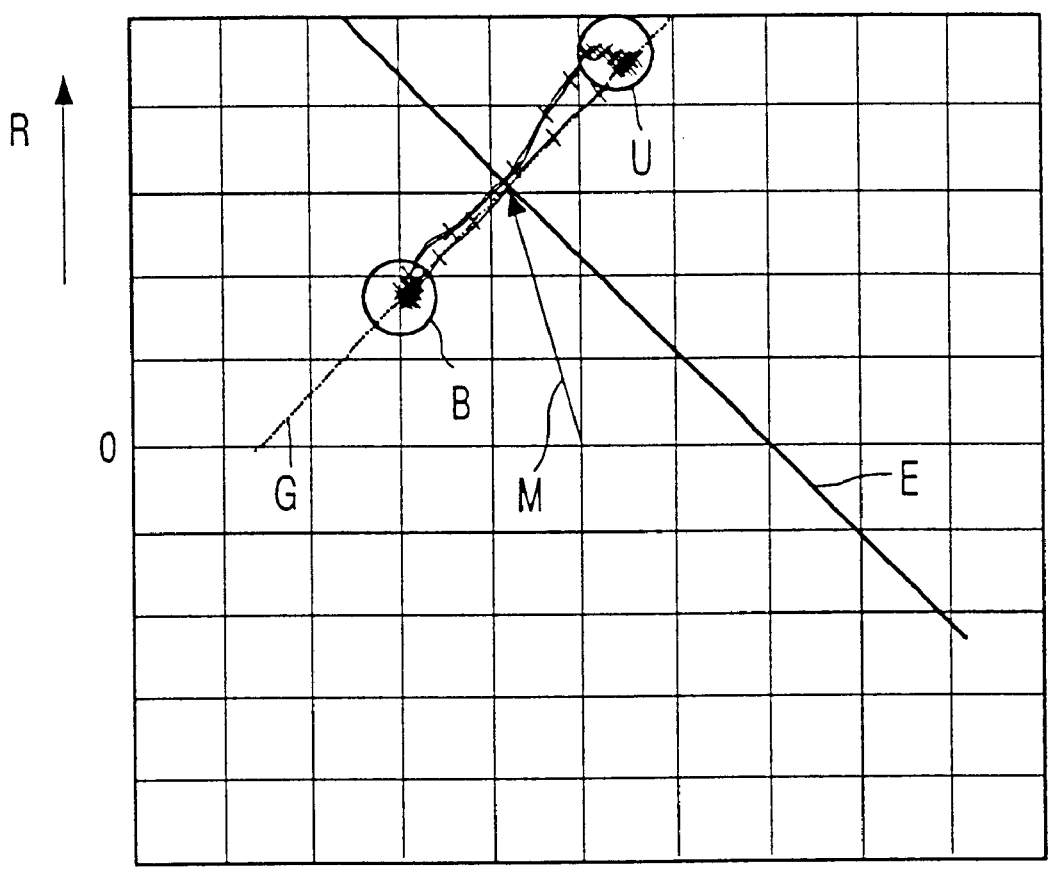
Figure 7:
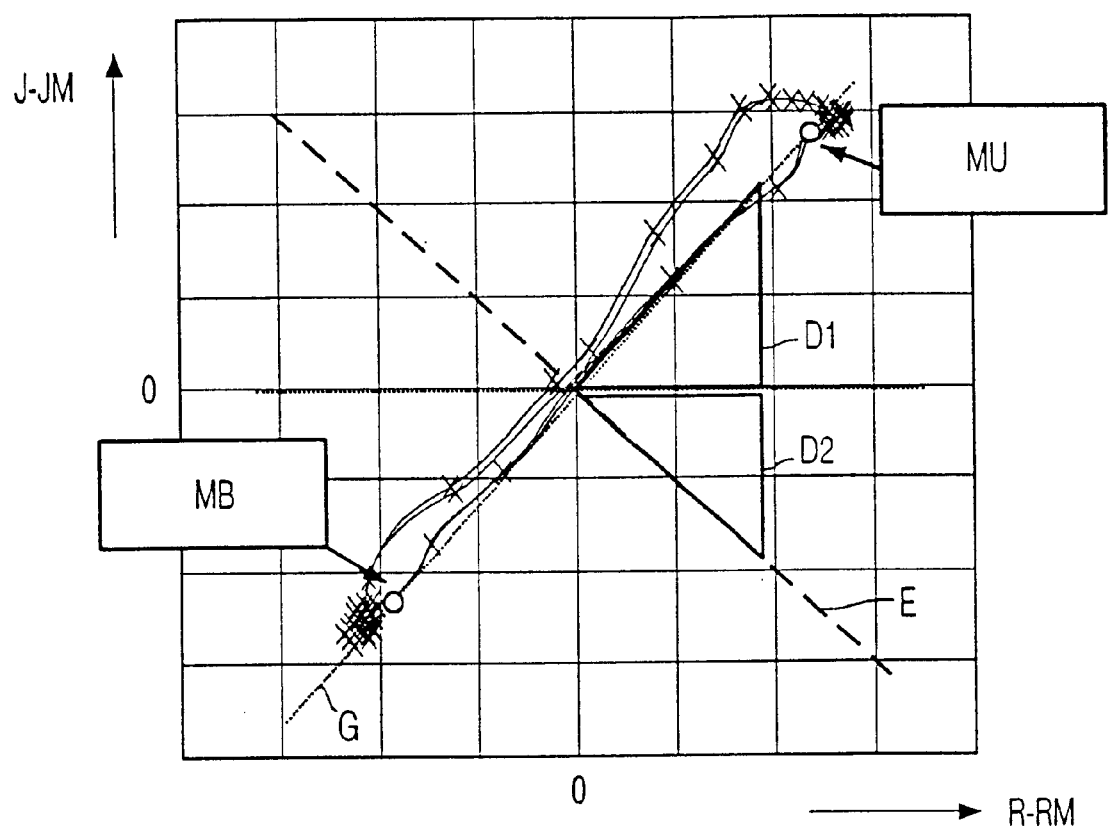
Figure 8:
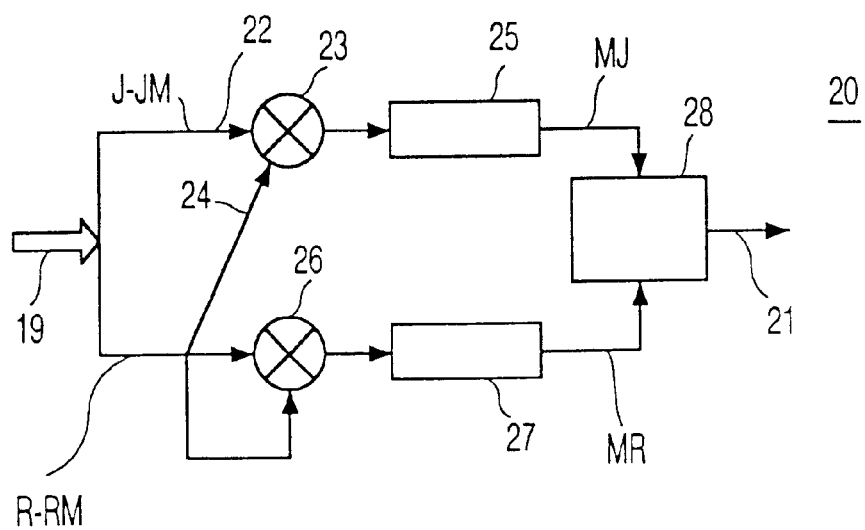
Figure 9:
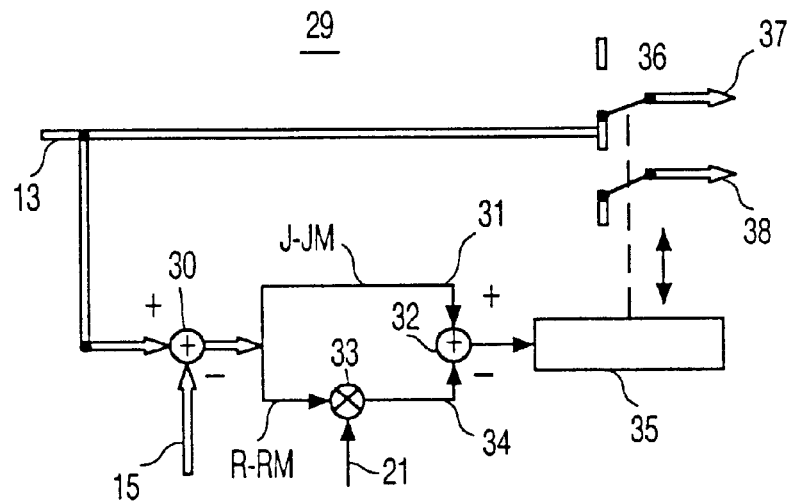
Figure 10:
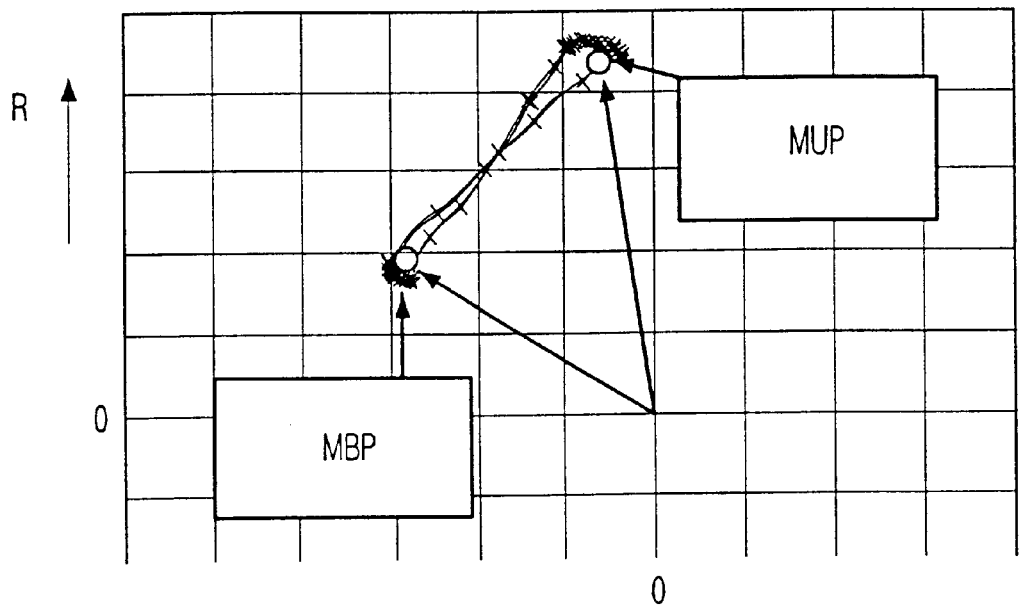

An embodiment of the invention is shown in the FIGS. 3 to 10 of the drawing and will be described in detail hereinafter. Therein:

FIG. 3 shows a block diagram of a circuit arrangement according to the invention, FIG. 4 shows an example of a typical variation in time of the input data signal, FIG. 5 shows a complex envelope formed from the input data signal shown in FIG. 4 and subdivided into a real part and an imaginary part, FIG. 6 shows the complex envelope of FIG. 5 as a complex locus curve, FIG. 7 shows a diagram illustrating the signal processing steps for evaluating the input data signal or the complex envelope, FIG. 8 is a more detailed representation of a part of the circuit arrangement shown in FIG. 3, FIG. 9 is a more detailed representation of a further part of the block diagram shown in FIG. 3, and FIG. 10 shows a further diagram illustrating the signal evaluation according to the invention in the form of a complex locus curve.

DETAILED DESCRIPTION

Figure 2:
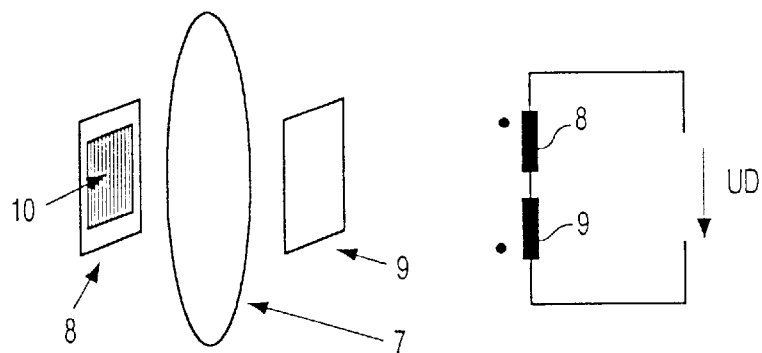

The circuit arrangement shown in FIG. 3 includes an input 11 which receives, for example the difference voltage UD of FIG. 2 as its input data signal. The difference voltage UD varies in time, for example as shown in FIG. 4. The letter t in this diagram denotes the time. In the time interval tb the "loaded" state prevails, i.e. the switch 4 in FIG. 1 is conductive.

In the time interval tu, however, the "unloaded" state prevails in which the switch 4 in FIG. 1 is not conductive. Consequently, in the loaded state the amplitude of the input signal (difference voltage UD) is lower than that in the unloaded state.

The circuit arrangement shown in FIG. 3 also includes a quadrature mixer 12 which has a customary construction and includes an in-phase output and a quadrature output. These two outputs are combined as a complex output 13. The signal at the in-phase output of the quadrature mixer 12 then describes the real part of the complex envelope of the difference voltage UD at the input 11; the signal at the quadrature output of the quadrature mixer 12 is assigned to the imaginary part of the complex envelope. The complex envelope thus formed can be represented as the variation in time of the real part and of the imaginary part. This is shown in FIG. 5 in which FIG. 5a shows the real part R and FIG. 5b shows the imaginary part I of the complex envelope as a function of time t.

Another representation of the complex envelope is the complex locus curve shown in FIG. 6. In the representation as a complex locus curve, the real part R and the imaginary part I define the plane of representation in which the individual signal values of the complex envelope are entered according to real part R and imaginary part I. FIG. 6 shows a series of signal values for the complex envelope as they result, for example, from a signal variation as shown in FIG. 4 and FIG. 5, respectively. This representation shows two cumulations of signal values which are marked by circles in FIG. 6 and bear the reference U for the unloaded state and the reference B for the loaded state.

In order to enable the determination of the modulation properties or to perform automatic separation between the loaded state and the unloaded state, and also the unambiguous assignment of individual signal values required for this purpose, the complex envelope in the form of the complex locus curve shown in FIG. 6 is subdivided into two parts, one part being assigned to the unloaded state of the data carrier whereas the other part is assigned to the loaded state of the data carrier. Such assignment requires the definition of a decision line which is also referred to as a decision threshold. In order to determine the decision threshold, first the mean value of the complex envelope can be determined by calculating the mean values separately for the real part R as well as for the imaginary part I. The resultant mean value M of the complex envelope, also representing a complex value, is represented by an arrow in FIG. 6.

The circuit arrangement shown in FIG. 3 includes a mean value detector 14 for the described determination of the mean value. The mean value detector 14 receives the complex envelope from the complex output 13 of the quadrature mixer 12. The mean value detector 14 forms a mean value RM from the real part R. A mean value IM is independently formed in the mean value detector 14 from the imaginary part I of the complex envelope. The mean values RM and IM together constitute the complex mean value M of the complex envelope which is presented on an output 15 of the mean value detector 14.

The circuit arrangement shown in FIG. 3 also includes a subtraction circuit 16, a first input 17 of which receives the complex envelope, separated into the real part R and the imaginary part I, whereas a second input 18 receives the mean value M of the complex envelope, separated into the real part RM and the imaginary part IM. The output 19 of the subtraction circuit 16 thus carries a complex signal without mean value, i.e. the complex envelope without mean value. This is shown as a locus curve in FIG. 7, in this case being the representation of the imaginary part I-IM over the real part R-RM of the complex envelope without mean value.

The FIGS. 6 and 7 show the decision threshold E as a straight line which extends between the signal values of the complex envelope for the loaded state and the unloaded state and through the mean value M of the complex envelope or through the zero point in the representation of the complex envelope without mean value. The slope of the decision threshold can be determined by making the complex envelope approximate a straight line and by rotating this straight line through 90° in the locus curve representation. The approximating straight line is denoted by the reference G in FIG. 6 and FIG. 7. The slope of the approximating straight line G, and hence the decision threshold E, is determined preferably by calculation of the least error squares. This is illustrated by FIG. 7. FIG. 8 shows an example of a circuit arrangement for carrying out this signal operation.

FIG. 8 shows a circuit element which is also referred to as a phase detector and is denoted by the reference 20 in FIG. 3. The phase detector 20 is connected to the output 19 of the subtraction circuit 16 in order to receive the complex envelope without mean value. A slope signal is output via an output 21 of the phase detector 20. In order to form this slope signal, the imaginary part I-IM of the complex envelope without mean value is applied from the output 19 of the subtraction circuit 16 to a first input 22 of a first multiplier circuit 23. The real part R-RM of the complex envelope without mean value is applied to a second input 24 of the first multiplier circuit 23. The signal corresponding to the product of these real and imaginary parts is applied to a first stage 25 for forming a mean value MI of said product. Analogously, the square of the real part R-RM of the complex envelope without mean value is formed in a second multiplier circuit 26 so as to form its mean value in a second stage 27. This mean value is referred to as MR. In a subsequent division circuit 28 the quotient of the mean values MI and MR is formed. This quotient represents the slope signal on the output 21. This slope signal provides the value of the slope of the decision threshold E in the FIGS. 6 and 7. In order to visualize this calculation, a first triangle DI in FIG. 7 denotes the slope of the approximating straight line whereas a second triangle D2 represents the slope of the decision threshold E.

The circuit arrangement shown in FIG. 3 also includes a decision circuit 29, also referred to as a decider, which is shown in more detail in FIG. 9. In the decider 29 the decision threshold in the complex locus curve of FIG. 6 or FIG. 7 is defined by way of the slope of the decision threshold in conformity with the slope signal on the output 21 of the phase detector and the mean value M of the complex envelope. To this end, the decider 29 includes a second subtraction circuit 30 which, similar to the (first) subtraction circuit 16, first forms the complex envelope without mean value according to real part and imaginary part by subtraction of the mean value M from the complex envelope. Its imaginary part I-IM is applied directly to a first input 31 of a third subtraction circuit 32. In a third multiplier circuit 33 the real part R-RM of the complex envelope without mean value is multiplied by the slope signal from the output 21 of the phase detector 20. This product represents the decision threshold signal whose representation in the complex locus curve is the straight line E. The decision threshold signal is applied to a second input 34 of the third subtraction circuit 32 and is subtracted from the imaginary part I-IM of the complex envelope without mean value in said third subtraction circuit 32. The result is applied to a comparison circuit 35 and therein it is checked whether its value is larger or smaller than zero. The decider thus checks whether the imaginary part of the complex envelope without mean value, also referred to as the imaginary part signal without mean value, lies above or below the decision threshold E in the representation of the complex locus curve, i.e. above or below that value on the decision threshold E which is determined by the associated value of the real part R-RM of the complex envelope without mean value, also referred to as the real part signal.

The comparison circuit 35 controls a switch 36. The switch 36 connects the complex output 13 of the quadrature mixer 12 to a first decider output 37 in the case of the state "loaded" whereas the switch 36 connects the complex output 13 to a second decider output 38 in the case of the "unloaded" state.

After the classification of the signal values of the complex envelope according to the loaded state and the unloaded state, a mean value calculation can be performed for the two states separately. To this end, the circuit arrangement shown in FIG. 3 also includes a respective mean value detector 39 for the loaded state and a mean value detector 40 for the unloaded state. The corresponding mean values are presented via outputs 41 and 42, respectively. The calculation of the mean value in the mean value detectors 39, 40 can be performed in different ways. It is notably possible to determine a linear, quadratic or geometrical mean value.

In the representation chosen for FIG. 7, for example, a respective mean value MB thus determined is entered for the loaded state whereas MU is entered for the unloaded state.

In comparison therewith, FIG. 10 shows the representation of the man values MU and MB in a manner similar to FIG. 6, i.e. without subtraction of the mean value M of the complex envelope. The mean values obtained in this case are denoted as MUP for the unloaded state and as MBP for the loaded state and are represented as pointers in FIG. 10. This representation, or a corresponding signal processing, is particularly attractive for an evaluation of the phase modulation.

The circuit arrangement shown in the FIGS. 3, 8 and 9 can be implemented by for the digital signal processing technique.

What is claimed is:

1. A method for evaluating an input data signal generated by load modulation, characterized in that a complex data signal which has a first signal component, referred to as a real part, and a second signal component, referred to as an imaginary part, is derived from the input data signal, a mean value signal of the complex data signal is formed by forming the mean value of the real part on the one hand and of the imaginary part on the other hand, a complex signal without mean value, having a real part signal without mean value and an imaginary part signal without mean value, is formed by forming the difference between the complex data signal and the mean value signal of the complex data signal, a first quadratic error signal is formed by signal multiplication of the real part signal without mean value by itself and a second quadratic error signal is formed by signal multiplication of the real part signal without mean value by the imaginary part signal without mean value, a slope signal is formed by signal division of the first quadratic error signal by the second quadratic error signal, a decision threshold signal is formed by signal multiplication of the slope signal by the real part signal without mean value, and an information signal as to whether a value of the input data signal has been formed in a loaded state or an unloaded state during the load modulation is formed by comparing the imaginary part signal without mean value with the decision threshold signal.

2. A method as claimed in claim 1, characterized in that an in-phase signal and a quadrature signal are formed by quadrature mixing in order to form the complex data signal, the in-phase signal constituting the real part and the quadrature signal constituting the imaginary part of the data signal which is referred to as a complex envelope.

3. A method as claimed in claim 1, characterized in that from the input data signal a complex baseband signal is derived as the complex data signal.

4. A method as claimed in claim 1, characterized in that an in-phase signal and a quadrature signal are formed by Fourier transformation in order to form the complex data signal, the in-phase signal constituting the real part and the quadrature signal constituting the imaginary part of the data signal which is referred to as a complex envelope.

5. A method as claimed in claim 1, characterized in that the real part and the imaginary part are derived by sampling the input data signal at two instants which are offset relative to one another by at least approximately one quarter period of a carrier oscillation of the input data signal.

6. A method as claimed in claim 1, characterized in that signal values of the complex data signal are determined separately for the loaded state and the unloaded state.

7. A method as claimed in claim 6, characterized in that an amplitude swing signal and/or a modulation index signal is derived from the signal values separately determined for the loaded state and the unloaded state.

8. A method as claimed in claim 6, characterized in that a phase angle signal and/or a phase swing signal is derived from the signal values separately determined for the loaded state and the unloaded state.

9. A method as claimed in claim 6, characterized in that a complex modulation swing signal is derived from the signal values separately determined for the loaded state and the unloaded state.

10. A circuit arrangement for evaluating an input data signal generated by a load modulation, the circuit comprising:

a data signal generating circuit for forming from the input data signal a complex data signal which has a first signal component, referred to as a real part, and a second signal component, referred to as an imaginary part;

a mean value detector for forming a mean value signal of the complex data signal by forming a first mean value of the real part on the one hand and a second mean value of the imaginary part on the other hand;

a subtraction circuit for forming a complex signal without mean value, having a real part signal without mean value and an imaginary part signal without mean value by forming a difference between the complex data signal and the mean value signal of the complex data signal;

a multiplier circuit for forming a first quadratic error signal by signal multiplication of the real part signal without mean value by itself, for forming a second quadratic error signal by signal multiplication of the real part signal without mean value by the imaginary part signal without mean value, and for forming a decision threshold signal by signal multiplication of a slope signal by the real part signal without mean value;

a division circuit for forming the slope signal by signal division of the first quadratic error signal by the second quadratic error signal;

a comparison circuit for forming an information signal by comparing the imaginary part signal without mean with the decision threshold signal, the information signal indicating whether a value of the input data signal has been formed in a loaded state or an unloaded state.

11. A circuit arrangement as claimed in claim 10, wherein the data signal generating circuit includes a quadrature mixer.

12. A circuit arrangement as claimed in claim 10, wherein the data signal generating circuit includes a Fourier transformation circuit.

13. A circuit arrangement as claimed in claim 10, wherein the data signal generating circuit includes two sample-and-hold circuits which are controlled by means of a clock signal derived from a frequency of a carrier oscillation of the input data signal.

14. A circuit arrangement as claimed in claim 10, further comprising:

a further mean value detector for the separate determination of the mean value of signal values of the complex data signal for the loaded state and the unloaded state.

15. A circuit arrangement as claimed in claim 14, further comprising:

a signal evaluation circuit for determining the amplitude modulation and/or the phase modulation and/or the modulation swing.

16. An apparatus for evaluating an input data signal generated by a data carrier by load modulation, the apparatus comprising:

a data signal generating circuit for forming from the input data signal a complex data, signal which has a first signal component, referred to as a real part, and a second signal component, referred to as an imaginary part;

a mean value detector for forming a mean value signal of the complex data signal by forming a first mean value of the real part on the one hand and a second mean value of the imaginary part on the other hand;

a subtraction circuit for forming a complex signal without mean value, having a real part signal without mean value and an imaginary part signal without mean value by forming a difference between the complex data signal and the mean value signal of the complex data signal;

a multiplier circuit for forming a first quadratic error signal by signal multiplication of the real part signal without mean value by itself, for forming a second quadratic error signal by signal multiplication of the real part signal without mean value by the imaginary part signal without mean value, and for forming a decision threshold signal by signal multiplication of a slope signal by the real part signal without mean value;

a division circuit for forming the slope signal by signal division of the first quadratic error signal by the second quadratic error signal;

a comparison circuit for forming an information signal by comparing the imaginary part signal without mean with the decision threshold signal, the information signal indicating whether a value of the input data signal has been formed in a loaded state or an unloaded state.

* * * * *